US009074822B1

(12) United States Patent
Ramachandran et al.

(10) Patent No.: US 9,074,822 B1
(45) Date of Patent: Jul. 7, 2015

(54) STRUCTURES UTILIZING PHASE CHANGE FOR HEAT MANAGEMENT APPLICATIONS

(71) Applicant: Lockheed Martin Corporation, Bethesda, MD (US)

(72) Inventors: Gautham Ramachandran, Fremont, CA (US); Scott W. Smith, San Jose, CA (US); Sanjay Prasad, Tarpon Springs, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/072,673

(22) Filed: Nov. 5, 2013

Related U.S. Application Data

(62) Division of application No. 12/914,392, filed on Oct. 28, 2010, now Pat. No. 8,679,651.

(60) Provisional application No. 61/255,829, filed on Oct. 28, 2009.

(51) Int. Cl.
*C09K 5/02* (2006.01)
*F28D 15/02* (2006.01)

(52) U.S. Cl.
CPC .. *F28D 15/02* (2013.01); *C09K 5/02* (2013.01)

(58) Field of Classification Search
CPC ........ C04B 1/009; C04B 1/52; C04B 1/5155; C04B 38/0615; C04B 38/06; C04B 35/645; C04B 35/634; C04B 35/803; C04B 35/111; C22C 1/1036; B01D 39/2093
USPC ........... 428/307.7, 539.5, 315.7; 264/44, 122, 264/639, 641, 645
See application file for complete search history.

(56) References Cited

U.S. PATENT DOCUMENTS

| | | | |
|---|---|---|---|
| 3,281,079 A | 10/1966 | McAlexamder | |
| 3,285,714 A | 11/1966 | Davies | |
| 3,789,096 A * | 1/1974 | Church et al. | 264/122 |
| 3,864,154 A * | 2/1975 | Gazza et al. | 428/539.5 |
| 3,962,081 A | 6/1976 | Yarwood et al. | |
| 4,024,212 A | 5/1977 | Dore et al. | |
| 4,075,303 A | 2/1978 | Yarwood et al. | |
| 4,302,502 A * | 11/1981 | Narumiya | 428/312.6 |
| 4,559,244 A * | 12/1985 | Kasprzyk et al. | 427/227 |
| 4,717,629 A * | 1/1988 | Ishikawa et al. | 428/566 |
| 4,822,694 A | 4/1989 | Randin et al. | |
| 5,158,916 A * | 10/1992 | Claussen | 264/639 |
| 5,454,999 A * | 10/1995 | Jayashankar et al. | 419/32 |
| 6,200,691 B1 * | 3/2001 | Moore et al. | 428/615 |

(Continued)

OTHER PUBLICATIONS

Mehling, et al., Heat and Cold Storage With PCM: An Up to Date Introduction Into Basics and Applications, Chapter 2 Solid-Liquid Phase Change Materials, pp. 11-55, <http://www.springer/com/978-3-540-68556-2> 2008.

(Continued)

*Primary Examiner* — Noah Wiese
(74) *Attorney, Agent, or Firm* — McDermott Will & Emery LLP

(57) ABSTRACT

An article is described that comprises a reticulated foam structure comprising a first ceramic or metal composition, and a second ceramic or metal composition disposed within the reticulated foam structure. The article may be compressed and sintered to form a monolith that can be used for mange heat by consuming heat energy through a phase change of one of the compositions.

10 Claims, 1 Drawing Sheet

(56) References Cited

U.S. PATENT DOCUMENTS 6,635,339 B1 * 10/2003 Adler et al. ............... 428/307.7
6,726,962 B1     4/2004 Loszewski
6,939,610 B1     9/2005 Kaul

OTHER PUBLICATIONS

Terry, et al., "Transpiration and Film Cooling of Liquid Rocket Nozzles," Mar. 21, 1966.

* cited by examiner

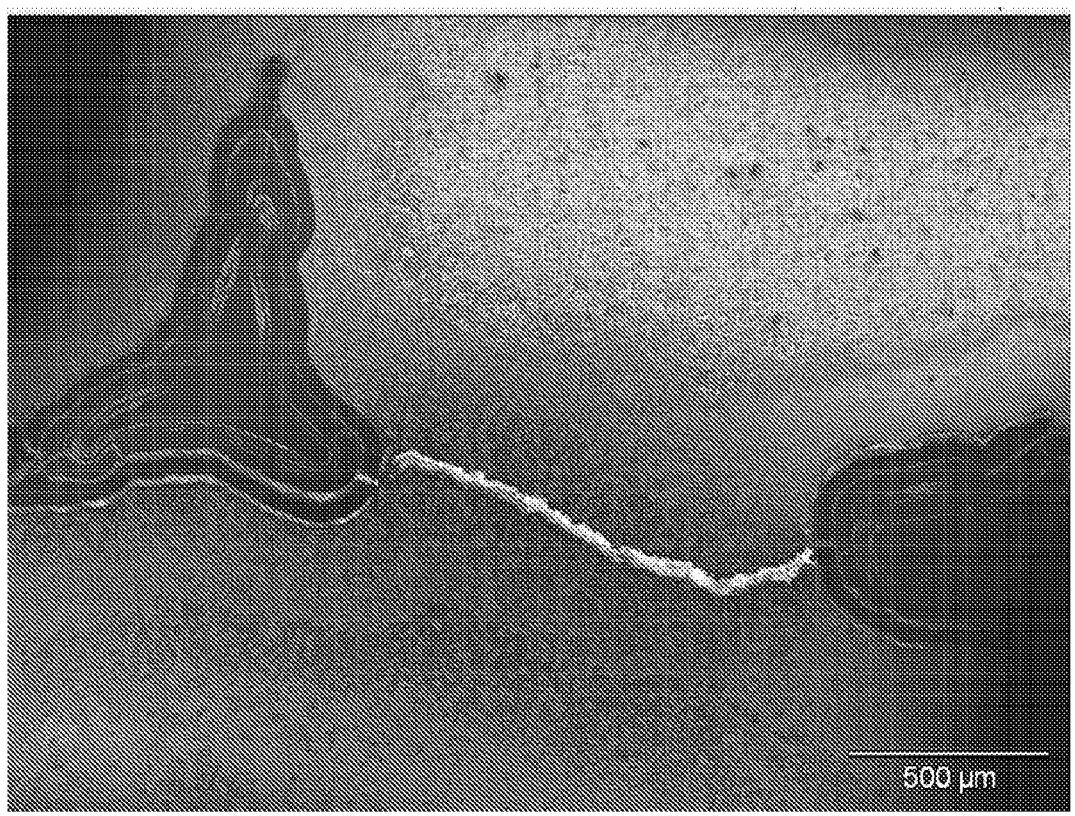

STRUCTURES UTILIZING PHASE CHANGE FOR HEAT MANAGEMENT APPLICATIONS

CROSS-REFERENCES TO RELATED APPLICATIONS

This patent application is a divisional of U.S. patent application Ser. No. 12/914,392, filed Oct. 28, 2010, which claims priority to U.S. Provisional Patent Application No. 61/255,829, filed Oct. 28, 2009, each of which is incorporated herein by reference in its entirety.

BACKGROUND OF THE INVENTION

The present invention generally relates to ceramic materials, more specifically to ceramic materials for use in extreme environments.

Extreme environments such as those found in solid rocket motor (SRM) boost propulsion nozzles, hypersonic and control surfaces are demanding on the structural materials used in them. Carbon based composites are frequently used for such applications but suffer from significant erosion and recession through their service life, thus imposing undesirable limits on design and/or duty cycles. Materials systems that are non-eroding in such environments offer significant improvements in performance and enable more aggressive duty cycles. For example, recent developments have demonstrated near zero erosion behavior of TaC—Ta$_2$C based ceramic throats in aluminized motor nozzle throats. The stability of HfB$_2$—SiC in hypersonic reentry aerothemal heating environments has also been demonstrated. However, these systems are at the upper limits of performance and the capability of their constituent materials.

Active cooling is an approach used in many aerospace systems for heat flux management where a working fluid is available. However, solid rocket motors and reentry vehicles typically do not have such systems and their addition would come with significant penalties in weight and complexity.

Thus, there is a need to provide improved material systems that perform in applications that pose challenging environments. The present invention satisfies this need and provides related advantages as well.

SUMMARY OF THE INVENTION

In an exemplary embodiment, an article is provided that comprises a reticulated foam structure comprising a first ceramic or metal composition, and a second ceramic or metal composition disposed within the reticulated foam structure; wherein at least one of the first and second compositions is a ceramic. In a more specific, nonlimiting exemplary embodiment, one of the first and second ceramic or metal compositions remains a solid at temperatures below a phase change temperature threshold, and the other of the first and second ceramic or metal compositions exhibits a phase change from a solid to either a liquid or vapor at a temperature below the phase change temperature threshold.

In another exemplary embodiment, a method is provided. The method includes:
  providing a reticulated foam structure comprising a first ceramic or metal composition;
  loading particles comprising a second ceramic or metal composition into spaces in the reticulated foam structure; and
  compressing and heating the reticulated foam structure having the particles loaded therein to sinter and form a monolithic structure.

In yet another exemplary embodiment, a method of managing heat is provided. The method includes:
  providing an article comprising a first ceramic composition and a second ceramic or metal composition, wherein one of the first or second compositions remains a solid at temperatures below a phase change temperature threshold, and the other of the first or second compositions exhibits a phase change from solid to either liquid or vapor at a temperature below the phase change temperature threshold;
  exposing the article to heat from a heat source sufficient to cause a phase change of said composition that exhibits a phase change from solid to either liquid or vapor at a temperature below the phase change temperature threshold without causing a phase change of the other of said first and second compositions, such that heat energy from the heat source is thereby consumed by the phase change.

These and other features and advantages will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

FIG. 1 is a photograph of a structure prepared from a reticulated ceramic foam embedded in a matrix ceramic material.

DETAILED DESCRIPTION

The invention will now be described with reference to specific embodiments, without limiting same.

According to exemplary embodiments, articles may be prepared by disposing a second ceramic or metal composition within a reticulated foam structure that comprises a first ceramic metal composition. Ceramic or metal reticulated foam structures are well-known in the art, and are widely commercially available for a variety of applications such as filtering molten metals, so the details of their manufacture need not be disclosed here. However, they are generally prepared by starting with a reticulated polymeric foam, such as a polyurethane foam. Reticulated polymer foams are highly open cell web-like structures that are prepared by first preparing a conventional cellular polymer foam, and then bursting the shared cell faces, leaving a three-dimensional open web-like structure formed from the outer edges of the shared cell faces. Fluids may move relatively freely through this structure. In some exemplary embodiments, reticulated foam structures may be fabricated by vapor deposition of ceramic or metallic materials onto the underlying polymer foam structure such as a reticulated polyurethane foam, followed by heating to a temperature sufficient to pyrolyze the polymer. In some other exemplary embodiments, the web-like reticulated foam structure may be coated throughout with a slurry of ceramic or metal particles, followed by removal of any excess slurry and heating to a temperature sufficient to both sinter the ceramic or metal particles and also pyrolyze the polymer, leaving a reticulated ceramic or metal foam structure. In some embodiments, the slurry solvent may be dried off in order to ensure a contiguous coating on the reticulated polymer foam. In some other embodiments, the heating of the coated foam may be ramped up to first evaporate the solvent before exposing the structure to heat at temperatures sufficient to sinter the ceramic or metal particles and pyrolyze the polymer. In some exemplary embodiments, reticulated foam structures may be fabricated by vapor deposition of ceramic or metallic materials onto an underlying carbonaceous skeletal foam structure such as a reticulated polyurethane foam, followed by heating to a temperature sufficient to pyrolyze the underlying foam. The properties and specifications of the foam structure can vary widely depending on the desired properties of the final product. In some exemplary embodiments, foam density may range from about 3%-50% (volume basis), and porosity may range from about 1-50 pores per inch (ppi).

In exemplary embodiments, a second ceramic or metal composition is disposed within the reticulated ceramic or metal foam structure. This may be accomplished by loading particles of ceramic or metal powder into the reticulated ceramic or metal foam structure, and using techniques such as vibration to promote the infiltration of these powder particles into the open volume spaces in the reticulated foam. For example, the reticulated ceramic or metal foam structure may be placed into a container having an open top (e.g., an open box having dimensions that approximate the foam structure or, if the structure is to be subsequently subjected to compression, a die cavity), and the powder particles poured onto the foam structure. Vibrating the foam structure either continuously or at intervals while applying the powder particles may promote penetration into and uniform distribution of the powder particles throughout the foam structure. A wide range of particle sizes may be used for the ceramic or metal powder particles to be disposed within the ceramic or metal reticulated foam structure. In some exemplary embodiments, a fine particle size may be used such as 325 mesh.

The reticulated ceramic or metal foam structure having particles of a second ceramic or metal composition disposed therein may then be heated to sinter the second ceramic or metal composition, thereby forming an article of relatively low density. In some exemplary embodiments, however, the foam structure may be compressed and heated, for example in a heated die press, to form a dense monolithic structure containing discrete regions of the first and second compositions. Although this compressed structure will be different in appearance to the initial reticulated foam structure, it is for purposes herein still considered to be a reticulated foam structure comprising a first ceramic or metal composition and a second ceramic or metal composition disposed within the reticulated foam structure. Although the pressure and heat may be widely varied depending on the desired physical properties of the final product, sintering temperatures may generally range between about 1200° C. and about 2500° C. and pressures may generally range between about 1 and 25 ksi.

In some aspects, embodiments disclosed herein relate to an article that can be used to manage heat, particularly in extreme heat applications of up to about 3000° C. Such heat management articles may include a phase change material, which will melt or sublime at high temperatures, thus consuming heat energy, and a structural material that will remain solid at high temperatures, thus continuing to provide structural integrity. Management of heat by the change of phase process undergone by the phase change material has allows the article to maintain a lower temperature than the surrounding environment, and thus enables the structural material to withstand exposure to temperatures that would otherwise exceed its operational limits. Accordingly, in certain exemplary embodiments, one of the first and second ceramic or metal compositions functions as a structural material and remains solid at temperatures below a phase change temperature threshold, while the other of the first and second ceramic or metal compositions functions as a phase change material and exhibits a phase change from solid to either liquid or vapor at a temperature below the phase change temperature threshold. In one exemplary embodiment, the phase change temperature threshold is 2700° C. In another exemplary embodiment, the phase change temperature threshold is 2500° C. In yet another exemplary embodiment, the phase change temperature threshold is 2000° C. In yet another exemplary embodiment, the phase change temperature threshold is 1500° C.

In certain exemplary embodiments, the structural material is a refractory metal or a refractory ceramic. Exemplary refractory ceramics include but are not limited to $TaC$, $Ta_2C$, $HfC$, $ZrC$, $HfB_2$, $ZrB_2$, and mixtures thereof. Exemplary refractory metals include but are not limited to metals include rhenium, tungsten, tantalum, molybdenum, and niobium, and mixtures or alloys thereof. Exemplary phase change ceramic materials include but are not limited to $B_4C$, $SiC$, $Al_2O_3$, $AlN$, $BeB_6$, $Be_2C$, $BeO$, $BN$, $CaB_6$, $CeB_6$, $HfB_2$, $LaB_6$, $MgO$, $MgAl_2O_4$, $NbB_2$, $ScB_2$, $TiC$, $TiN$, $VB_2$, $YB_6$, $YB1_2$, $ZrB_2$, and mixtures thereof. The phase change material should possess a phase change enthalpy that enables it to meet heat management targets and specifications. In one exemplary embodiment, the phase change material has a phase change enthalpy of at least about 10 kJ/g. In another exemplary embodiment, the phase change material has a phase change enthalpy of at least about 20 kJ/g. In yet another exemplary embodiment, the phase change material has a phase change enthalpy of at least about 40 kJ/g. In a more specific exemplary embodiment, the phase change material is $B_4C$, which has a phase change enthalpy of about 55 kJ/g and a phase change temperature of about 2450° C.

In certain exemplary embodiments, articles described herein can be conceptualized as a ceramic or metal foam (the initial foam structure comprising a first ceramic or metal composition)) embedded in a matrix material (the sintered second ceramic or metal composition that was loaded into the void spaces of the reticulated foam structure). The volume fraction of the embedded foam structure can range from about 1% to about 50% of the article's total volume. Depending on the desired performance parameters, either the first ceramic or metal composition (i.e., the embedded foam structure) or the second ceramic or metal composition (i.e., the loaded-in matrix material) can function as the phase change material while the other functions as the structural material. Thus in one exemplary embodiment, the first ceramic or metal composition (i.e., the embedded foam structure) is the phase change material and the second ceramic or metal composition (i.e., the loaded-in matrix material) is the structural material. This embodiment can provide articles with higher contents of structural material, with concomitant greater structural integrity for the article after loss of the phase change material during exposure to extreme temperature environments. In another exemplary embodiment the first ceramic or metal composition (i.e., the embedded foam structure) is the structural material and the second ceramic or metal composition (i.e., the loaded-in matrix material) is the phase change material. This embodiment can provide articles with higher contents of phase change material, with concomitant greater levels of heat energy consumption. Both embodiments provide escape paths for the liquefied or volatilized phase change material as it undergoes phase change, either along the continuous web-like reticulated foam structure (where the embedded foam is the phase change material) or through the open cells of the foam structure (where the loaded-in matrix material is the phase change material). Such escape paths can help dissipate the buildup of pressure caused by the change of phase of the phase change material, enabling the article to maintain structural integrity.

In certain other exemplary embodiments, heat energy consumption from a phase change material may be achieved without the use of a reticulated foam structure. In these embodiments, particles of a first ceramic or metal composition and particles of a second ceramic or metal composition, where one of the compositions exhibits a phase change above the phase change transition temperature threshold and the other of the compositions exhibits a phase change below the phase change transition temperature threshold, may be mixed together, loaded into a mold and sintered to form an article. The article may be net shape (or near net shape) and/or it may be subjected to further machining to achieve a desired final shape. Such articles may have less clearly defined fluid escape paths compared to articles that use a reticulated foam structure, but may offer advantages in ease of processing and retention of structural integrity after undergoing heat-induced phase change of the lower phase temperature material. In order to achieve adequate phase change of the lower phase change temperature composition, excessive alloying of the two compositions should be avoided for the case where both of the compositions are metals. This can be controlled by careful manipulation of the sintering temperature so that excessive particle surface melting is avoided. In some exemplary embodiments, excessive alloying may be avoided by specifying that at least one of the compositions is a ceramic.

It is understood that modifications which do not substantially affect the activity of the various embodiments of this invention are also included within the definition of the invention provided herein. Accordingly, the following example is intended to illustrate but not limit the present invention.

EXAMPLE

A sample of an open-cell reticulated $B_4C$ ceramic foam, having a density of about 10% and a porosity of about 5-10 ppi, is loaded into a graphite or refractory metal die, and a blend of TaC and $Ta_2C$ powder having a 325 mesh particle size is poured into the die on top of the ceramic foam, with vibration used to enhance penetration of the powder into the foam. After the foam has been fully penetrated with the powder, it is subjected to hot isostatic pressing at a pressure of about 1000 psi and a temperature of about 1650° to form a sintered monolithic article. The article is removed from the press and allowed to cool before being subjected to thermal testing. A photomicrograph of a cross-section of such an article is shown in FIG. 1, where the dark triangular section is a cross-section of a $B_4C$ foam ligament surrounded by the lighter grey section, which is the tantalum-based ceramic matrix material.

A sample prepared similar to the above description was subjected to simulated testing in a high temperature environment (7500° F.) against a comparison sample of a sintered TaC based ceramic material without the $B_4C$ phase change embedded foam. The analysis results revealed that, by the end of the simulated exposure period, the heat had soaked back considerably and the comparison structure would be melted through the thickness in the peak heat flux regions. The sample with the $B_4C$ phase change embedded foam, however, melting of the structural tantalum-based ceramic material would be limited to just the surface without discernable penetrate into the thickness of the article even in the highest heat flux region.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method, comprising:
   providing a reticulated foam structure comprising a first ceramic or metal composition;
   loading particles comprising a second ceramic or metal composition into spaces in the reticulated foam structure; and
   compressing and heating the reticulated foam structure having the particles loaded therein to sinter and form a monolithic structure;
   wherein one of the first ceramic or metal composition or second ceramic or metal composition is selected from the group consisting of TaC, $Ta_2C$, and combinations thereof, and other of the first ceramic or metal composition or second ceramic or metal composition is selected from the group consisting of $B_4C$, SiC, and combinations thereof.

2. The method of claim 1, wherein the providing of the reticulated foam structure comprising the first ceramic or metal composition comprises:
   providing a reticulated polymer foam structure;
   coating the reticulated polymer foam structure with a slurry of particles comprising the first ceramic or metal composition or vapor depositing a layer of the first ceramic or metal composition onto the reticulated polymer foam structure; and
   heating the reticulated polymer foam structure coated with particles comprising the first ceramic or metal composition at a temperature and for a time sufficient to pyrolyze the polymer and, if the polymer foam structure was coated with a slurry of particles, sufficient to sinter the slurry particles.

3. The method of claim 1, wherein one of the first or second ceramic or metal compositions remains a solid at temperatures below a phase change temperature threshold, and the other of the first or second ceramic or metal compositions exhibits a phase change from solid to either liquid or vapor at a temperature below the phase change temperature threshold.

4. The method of claim 3, further comprising exposing the structure to heat from a heat source sufficient to cause a phase change of said composition that exhibits a phase change from solid to either liquid or vapor at a temperature below the phase change temperature threshold without causing a phase change of the other of said first or second compositions, such that heat energy from the heat source is thereby consumed by the phase change.

5. A method of managing heat, comprising:
   providing an article comprising a first ceramic composition and a second ceramic or metal composition, wherein one of the first or second compositions remains a solid at temperatures below a phase change temperature threshold, the other of the first or second compositions exhibits a phase change from solid to either liquid or vapor at a temperature below the phase change temperature threshold, the composition that remains a solid at temperatures below the phase change temperature threshold is selected from the group consisting of TaC, Ta$_2$C, and combinations thereof, and the composition that exhibits a phase change from solid to either liquid or vapor at a temperature below the phase change temperature threshold is selected from the group consisting of B$_4$C, SiC, and combinations thereof; and exposing the article to heat from a heat source sufficient to cause a phase change of said composition that exhibits a phase change from solid to either liquid or vapor at a temperature below the phase change temperature threshold without causing a phase change of the other of said first or second compositions, such that heat energy from the heat source is thereby consumed by the phase change.

6. The method of claim 5, wherein the phase change temperature threshold is about 2700° C.

7. The method of claim 5, wherein one of the first or second compositions remains a solid up to a temperature of at least about 3000° C., and the other of the first or second compositions exhibits a phase change from solid to either liquid or vapor at a temperature below about 2500° C.

8. The method of claim 5, wherein the composition that exhibits a phase change from solid to either liquid or vapor below the phase change temperature threshold has a phase change enthalpy of at least 10 kJ/g.

9. The method of claim 5, wherein the providing of the article comprises:

providing a reticulated foam structure comprising the first ceramic composition;

loading particles comprising the second ceramic or metal composition into spaces in the reticulated foam structure; and compressing and heating the reticulated foam structure having the particles loaded therein to sinter and form the article.

10. The method of claim 5, wherein the providing of the article comprises:

providing a reticulated foam structure comprising the second ceramic or metal composition;

loading particles comprising the first ceramic composition into spaces in the reticulated foam structure; and compressing and heating the reticulated foam structure having the particles loaded therein to sinter and form the article.

* * * * *